Aug. 23, 1966   R. L. FERRIS   3,268,250
FIFTH WHEEL PLATE ASSEMBLY

INVENTOR.
RAY L. FERRIS

Aug. 23, 1966  R. L. FERRIS  3,268,250

FIFTH WHEEL PLATE ASSEMBLY

Original Filed July 22, 1963  3 Sheets-Sheet 2

INVENTOR.
RAY L. FERRIS
BY Wayne Morris Russell

Aug. 23, 1966    R. L. FERRIS    3,268,250
FIFTH WHEEL PLATE ASSEMBLY
Original Filed July 22, 1963    3 Sheets-Sheet 3

INVENTOR.
RAY L. FERRIS
BY Wayne Morris Russell.

United States Patent Office 3,268,250
Patented August 23, 1966

3,268,250
FIFTH WHEEL PLATE ASSEMBLY
Ray Lavern Ferris, Thornton, Ill., assignor to Pullman Incorporated, Chicago, Ill., a corporation of Delaware
Original application July 22, 1963, Ser. No. 296,692, now Patent No. 3,190,595. Divided and this application Oct. 15, 1964, Ser. No. 415,216
3 Claims. (Cl. 287—20)

This application is a division of the copending application Serial No. 296,692 filed July 22, 1963, and now Patent No. 3,190,595.

The present invention relates to fifth wheel plate assemblies and more particularly to a new and improved fifth wheel plate assembly for a stanchion of the general type which is employed to hitch and support a trailer on a railway car.

It is an object to provide a trailer supporting and hitching plate assembly with an improved kingpin entry guiding arrangement for assuring positive and rapid locking of the kingpin on the plate.

It is a further object to provide a locking jaw arrangement which is constructed to minimize the bending moment stresses on the trailer kingpin with which the jaw is adapted to be lockingly engageable.

Briefly the present invention comprises an arrangement for automatically releasing the kingpin from locking engagement with the trailer supporting and hitching plate or as commonly referred to, the fifth wheel plate. As is well known fifth wheel plates include an opening in which there is disposed a locking arrangement for retaining the kingpin secured to the stanchion. These locking means are actuated to the kingpin locked position by the action of the kingpin extending through the opening. In accordance with the present invention means are provided for releasing the kingpin locking arrangement automatically when the tractor is used for moving the trailer.

Further objects and features will hereinafter appear.

In the drawings:

FIG. 5 is a cross-sectional view taken generally along the lines 5—5 of FIG. 3;

FIG. 6 is a cross-sectional view taken generally along the lines 6—6 of FIG. 1 showing the relationship of the kingpin locking components in the open position and the kingpin, shown in phantom lines as the latter initially engages the locking jaw;

Figure 1:
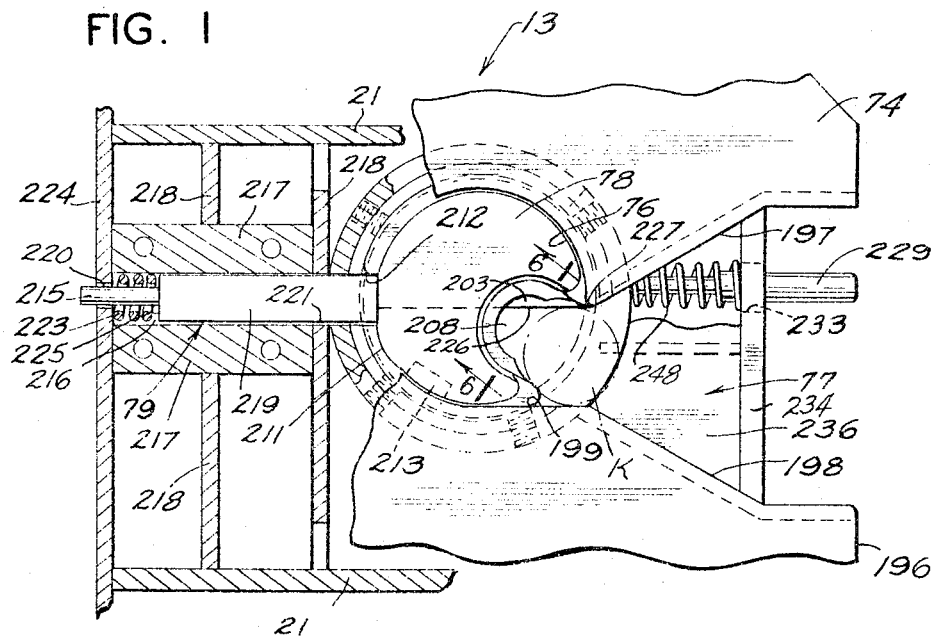
FIG. 1 is an enlarged fragmentary top plan view of the fifth wheel plate assembly embodying the present invention with some of the parts being broken away to show underlying details of structure and with the kingpin locking components being shown in the open position thereof.

Referring now to FIGS. 1 to 6 there is shown the structure of the fifth wheel plate assembly 13 of the present invention and which may be utilized with the stanchions and of the type employed ot transport semi-trailers on railway cars. The fifth wheel support plate assembly 13 includes the plate 74 from the underside of which there depends the flanges 21—21 between which the upper ends of the vertical strut legs 16 or 114 are pivotally secured. The plate 74 is formed with a substantially centrally located circular opening 76 which communicates with a kingpin entry slot 77 extending inwardly from the leading edge 196.

As shown, the center line of the kingpin entry slot 77 is displaced to one side of the center line of the circular opening 76 and is defined by inwardly converging sides 197 and 198 and a tangential side arranged substantially normal to the leading edge 196.

Fixed to the underside of the plate 74 and disposed coaxial with the opening 76 is a coupler jaw housing 201. Fastened within the housing 201 is a coupler jaw support assembly 202 including a support plate 203 upon which the coupler jaw 78 is supported for turning movement. The portion of the coupler housing 201 and support jaw support assembly 202 underlying the entry slot 194 are formed with openings 206 and 207 to accommodate the length of the kingpin K so that it may be received within the opening 76 as more fully to be explained hereinafter.

The coupler jaw 78 is turnably mounted on the support plate 203 and includes a U-shaped jaw opening 208 including a rim 209 adapted to seat within the groove G of the kingpin K. Formed on the periphery of the locking jaw 78 is a camming surface 211 (FIGS. 1 and 2) having a stop lip 212 disposed at one end thereof and a locking notch 213 at the other end. The stop lip 212 and locking notch 213 co-act with a resiliently biased locking plunger 219 of the coupler jaw locking assembly 79 disposed in a guideway 216 formed by transversely spaced blocks 217—217 fastened to the underside of the support plate 74 and suitably supported by cross braces 218 fixed between the inner ones of the pivot pin support flange 21.

The coupler jaw locking plunger assembly 79 includes the plunger 219 of which the inner end is slidably supported in an opening 221 formed in the coupler jaw housing 201 and the outer reduced end 215 in an opening 220 formed in a flange 224. The inner end of the locking plunger 219 is urged into engagement with the camming surface 211 on coupler jaw 78 by means of a biasing spring 223 disposed about the reduced end 215 of the opening 220 engaging at one end a shoulder 225 on the plunger 219 and at its other end the flange 224.

Figure 2:
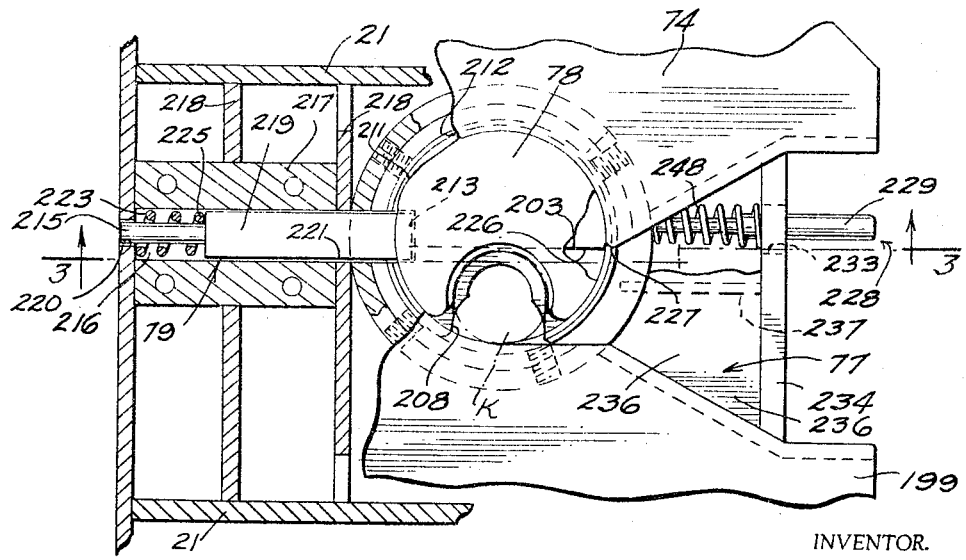
FIG. 2 is an enlarged fragmentary top plan view similar to FIG. 1, but showing the components in the kingpin locking position thereof.

In the unlocked position shown in FIG. 1 the inner end of the locking plunger 219 engages the stop lip 212 so as to limit the counterclockwise movement of the coupler jaw 78 and retain it in the kingpin receiving position shown. As the kingpin K passes through the entry slot and engages the coupler jaw 78, the latter is turned clockwise whereupon the raised camming surface 211 is operative to retract the locking plunger 219 against the force of the biasing spring 223 until the locking notch 213 is aligned with the plunger 219. Thereafter, the plunger 219 seats within the locking notch 213 and prevents further turning of the coupler jaw 78 and retains the latter locked within the kingpin opening and fastened to the support plate 74 as shown in FIGS. 2 and 6.

In connection with the engagement of the kingpin K with the coupler jaw 78, it should be noted as shown in FIGS. 1, 24 and 28 that the coupler jaw support plate is arranged to provide a guiding edge 226 which extends from the end corner 227 of the entry slot guiding edge 197 in substantialy parallelism to the tangential side 199. The guiding edge 226 of the plate 203 is transversely spaced from the tangential side 199 as shown in FIG. 6 so that the upper diameter U of the kingpin K contacts the guiding edge 199 and the lower diameter L of the kingpin K below the latching groove G slidably contacts the plate edge 226. In this manner the support plate guiding edge 226 serves to insure that the kingpin engages the coupler jaw opening in a manner which permits only clockwise turning thereof upon further movement into the circular opening 76. As the kingpin enters the opening 76 the coupler jaw continues its clockwise movement until the notch 213 aligns with the plunger 219 and is locked as shown in FIG. 2.

It is to be observed that the locking jaw 78 is supported on the support plate 74 so that a length of the upper diameter thereof, above the peripheral rim 209, lies within the confines of the circular opening 76. Moreover, the top surface of the coupler jaw 78 lies substantially coplanar with the upper surface of the support plate 74. This arrangement of the coupler jaw 78 disposed within the confines of the opening 76 so as to be turnable therein is made possible by way of the guiding edge arrangement 226 above described which introduces the kingpin into engagement with the coupler jaw such that the latter is movable clockwise only as viewed in FIGS. 1 and 2.

Heretofore, in the absence of the kingpin guiding arrangement of the present invention it was possible for the kingpin to engage the coupler jaw in a manner which tended to bind the coupler jaw within its support housing and thereby prevented free turning thereof to the locked position. Because of this difficulty the upper surface of the coupler jaw was disposed below the bottom surface of the support plate. With the prior structure, it should be readily apparent that the length of the upper end of the kingpin fixed to the trailer was substantially unsupported. Under these conditions, the kingpin was subject to severe bending moments caused by the forces normally present during transit of the trailer on the railway car.

However, with the structure of the present invention substantially the entire length of the kingpin K, is supported by the confinement within the coupler jaw 78 as illustrated in FIG. 6 such that failure of the kingpin in bending is prevented.

Figure 4:
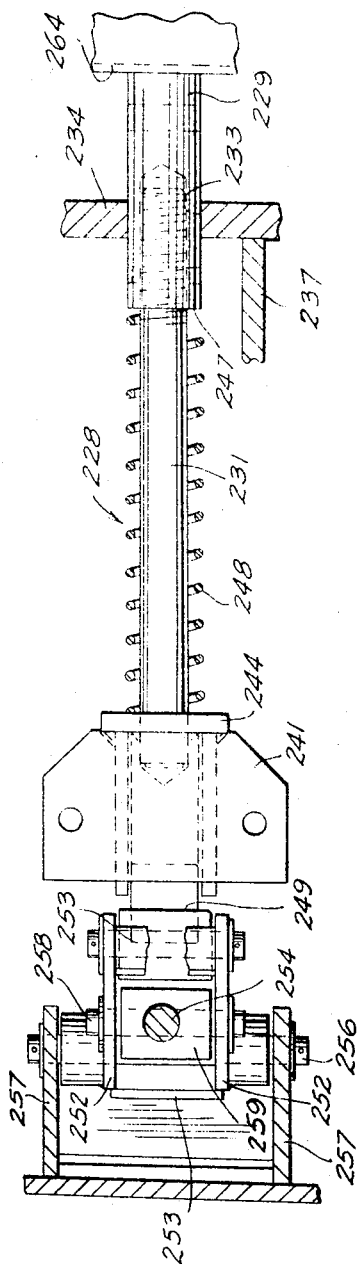
FIG. 4 is a top view of the kingpin releasing mechanism taken generally along the lines 4—4 of FIG. 3.
Figure 3:
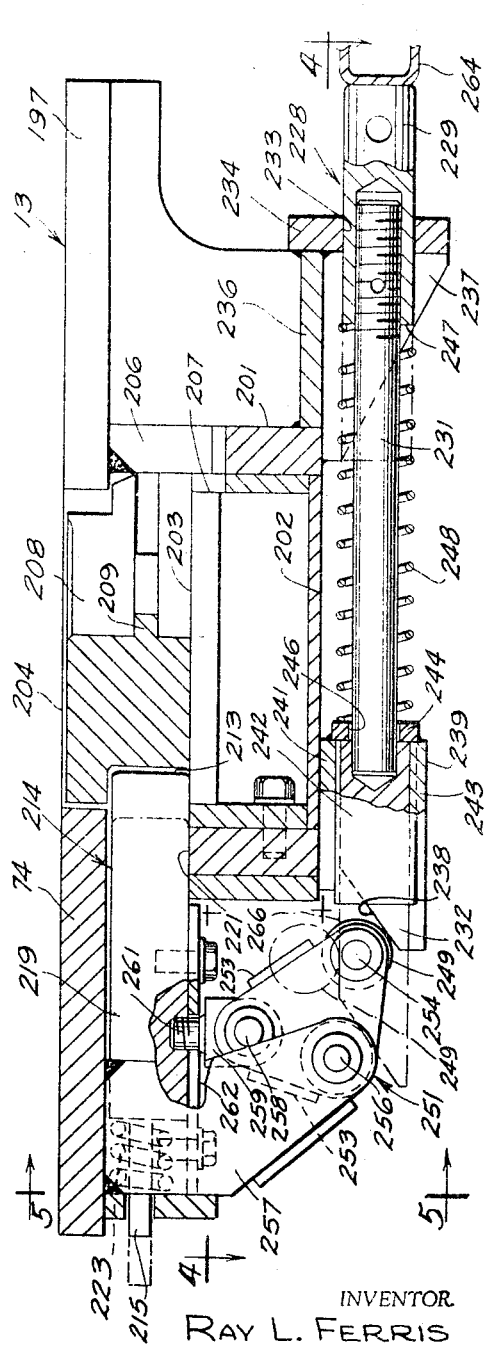
FIG. 3 is a cross-sectional view taken along the lines 3—3 of FIG. 2 showing in particular the mechanism for releasing the locking jaw.

In accordance with the present invention there is provided a means for automatically releasing the coupler jaw 78 so that the trailer may be detached therefrom when the tractor is positioned to remove the trailer. As shown in FIGS. 3 and 4 the coupler jaw releasing means 228 includes a push button 229 threadably connected to one end of an actuating rod 231 to the other end of which there is fastened a camming block 232. The button 229 fixed to the actuator rod 231 is slidably supported in an opening 233 formed in a vertical plate 234 extending across the lower ends of the entry slot sides 197 and 198. For providing further support for the vertical plate 234 is a horizontal plate 236 suitably supported by a gusset 237 as shown in FIG. 3.

The camming block 232 is preferably formed of substantially rectangular section having an inclined camming surface 238 formed on its leading end. At its other end the camming block 232 is suitably fixed as by a force fitted to the other end of the actuator rod 231. The camming block 232 is slidably supported in a housing 239 including a top plate 241 which is bolted to the underside of the coupler jaw housing 201, sides 242 and a bottom wall 243. At the inner end, there is fixed an end wall 244 having an opening 246 accommodating the actuating rod 231. Disposed between the housing end wall 244 and the shoulder 247 defined by the end of the button 229 fixed to the other end of the actuator rod 231 is a biasing spring 248 which serves to normally urge the camming block 232 into engagement with the end wall 244. In this position, the camming block 232 is retained within the housing 239 and a portion of the inclined camming surface projects from the open end thereof.

Contacting the inclined camming surface 238 is a follower roller 248 of a follower assembly 251. The follower assembly 251 includes a pair of laterally spaced supports plates 252 of substantially triangular contour. Fixed across the upper edges and the rear edges of the support plate 252 is tie plate 25. The follower roller 248 is turnably mounted on a shaft 254 supported by the plates 252 at the lower corners thereof. At the other lower corner, there is turnably mounted a shaft 256 carried by a pair of laterally spaced downwardly depending flanges 257 which are fixed at the upper ends thereof to the underside of the fifth wheel support plate 74 to the plunger guide blocks 217. In this manner the follower assembly 251 is mounted for rocking movement relative to the top plate 74.

At the upper corners of the plates 252 there is supported a shaft 258 which turnably supports a pivot block 259 having a threaded end 261 which is extended through an elongated opening 262 provided in the locking plunger support plate 263 and is threaded into the plunger 219 substantially intermediate the ends thereof.

Assuming that a tractor is being backed into its position for removing the trailer from a stanchion on which the fifth wheel plate assembly is adapted to be supported as the trailer is backed the member 264 fixed to the tractor chassis abuts against the button end 229 of the actuator rod 231. Upon further backing, the actuator rod 231 is moved inwardly with respect to the leading edge of the support plate 74 whereupon the camming block 232 at the other end of the actuating rod 231 is displaced outwardly of the housing 239. During this movement of the camming block 232, the follower roller 245 engaging the inclined camming surface 238 causes the follower assembly 251 to be rocked counterclockwise about the pivot shaft 256. As the rocker assembly 251 is rocked about the pivot 256, the pivot block 259 threaded into the locking plunger 219 is operative to retract the locking plunger 219 from the locking notch 213 so that the coupler jaw 204 is free to turn counterclockwise to its release position as the kingpin K is moved outwardly toward the entry slot 77. It is to be observed the inclined camming surface is of a length such that the locking plunger 219 is fully retracted when the cam roller 249 engages the upper ends thereof. Thereafter, during further movement of the camming block 232 outwardly of the housing 239, the camming roller 249 rides on the upper horizontal face 266 which forms in the nature of an idler surface such that the camming assembly 251 is no longer rocked counterclockwise about the pivot 256. In this manner, the plunger 219 is not retracted beyond the phantom line position shown in FIG. 3. The formation of an idler surface 266 on the upper face of the camming block 232 is advantageous in permitting simultaneous actuation of the diagonal strut release 164 and coupler jaw release 228.

What is claimed is:

1. A fifth wheel plate assembly for supporting and hitching a trailer having a kingpin depending from the underside thereof, said fifth wheel plate assembly comprising a plate, a substantially circular opening in said plate, an entry slot communicating with said circular opening, a coupler jaw supported for turning movement within said circular opening, said coupler jaw including a U-shaped jaw opening which is normally disposed to be engaged by the kingpin entering said circular opening through said entry slot in a manner causing said coupler jaw to be turned to close off communication between said circular opening and said entry slot and retain the kingpin captured within said opening, a locking notch formed on the periphery of said coupler jaw, a locking plunger mounted on said plate for lengthwise movement into and out of seating engagement with said locking notch when the latter is aligned therewith, resilient means biasing said locking plunger into seating engagement with said locking notch, means for retracting said locking plunger from seating engagement within said locking notch, said releasing means comprising a horizontal member movable lengthwise of said plate and having one end projecting outwardly of said plate, a camming member fixed to the other end of said horizontal movable member, a cam follower assembly means, means rockably mounting said cam follower assembly on said plate, said cam follower assembly including means fixed to said locking plunger and means slidably contacting said camming member, and being operative upon inward lengthwise actuation of said movably mounted member to be rocked so that said locking plunger is withdrawn from said locking notch.

2. The invention as defined in claim 1 wherein said camming member includes an inclined camming surface and wherein said slidably contacting means is a cam follower contacting said inclined camming surface, and wherein said means fixed to said cam follower assembly and said plunger is angularly spaced from said cam follower so that as said cam follower traverses said camming surface said cam follower assembly is caused to be rocked about said rockable mounting means and said means fixed to said plunger is operative to withdraw the latter from said locking notch.

3. The invention as defined in claim 2, wherein said camming surface includes an idler surface which said camming member slidably contacts during which no further rocking of said cam follower assembly occurs and thereby to permit limited lengthwise movement of said lengthwise movable member in excess of that employed to withdraw the locking plunger from said locking notch.

References Cited by the Examiner
UNITED STATES PATENTS

| | | | |
|---|---|---|---|
| 2,072,661 | 3/1937 | Walther et al. | 280—434 |
| 3,087,748 | 4/1963 | Livelsberger et al. | 287—20 |
| 3,181,480 | 5/1965 | Sherrie et al. | |

CARL W. TOMLIN, *Primary Examiner.*

T. A. LISLE, *Assistant Examiner.*